United States Patent Office 3,360,285
Patented Dec. 26, 1967

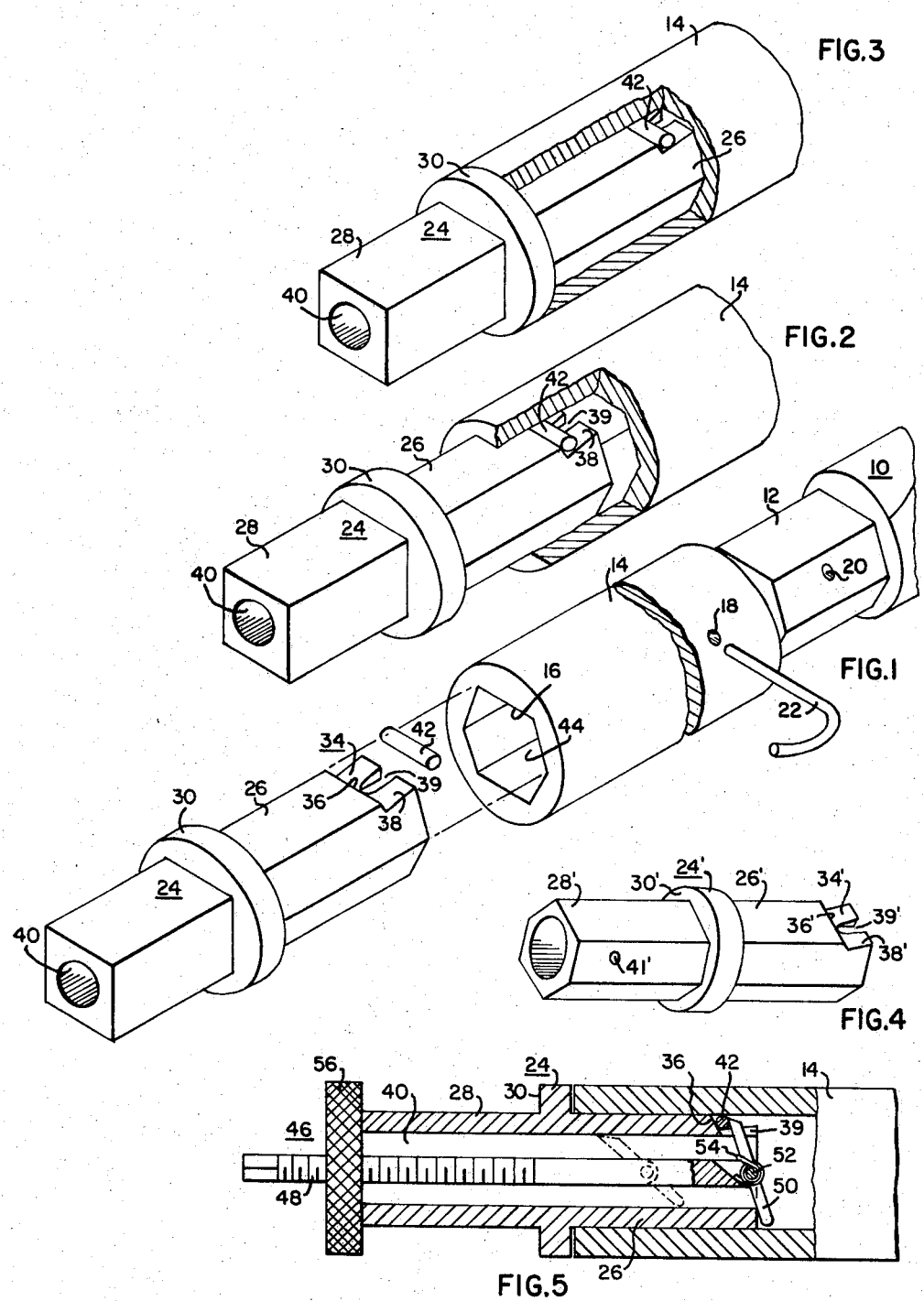

3,360,285
CONNECTORS
Elmer J. Huckshold, Mulkeytown, Ill., assignor to Allegheny Ludlum Steel Corporation, Brackenridge, Pa., a corporation of Pennsylvania
Filed Mar. 15, 1965, Ser. No. 439,899
5 Claims. (Cl. 287—2)

ABSTRACT OF THE DISCLOSURE

Apparatus for connecting first and second members for concurrent rotation wherein said second member includes a shank portion having a polygonal cross-sectional configuration, and said first member includes an axial bore configured for insertion of said second member freely into said bore, the shank portion of the second member having a cam surface formed thereon, the cam surface facing one wall of the bore when the shank portion is disposed in the bore, the cam surface being configured to slope toward the wall of the bore in a direction away from the entrance of the bore, the cam surface being planar and having roller means disposed in rolling contact therewith whereby when said roller means is positioned on the cam surface; the shank portion will freely slide into the bore but the roller means will coact with said cam surface and said wall to prevent said shank portion from being withdrawn from said opening.

Drilling rigs utilized in many types of mining operations, and particularly rotary and rotary-percussion drills such as those utilized for drilling holes for roof bolts are all provided with drill chucks into which drive members are chucked. Configuration of the drill chucks of different manufacturers differs, and consequently various styles of shanks or drive members must be provided to fit the various chucks. Hollow drill rods are provided which are of various styles and lengths, and are inserted into the drive members and connected together to provide the proper length of drill rod. The rods are manufactured by forging the opposite ends at the factory to the proper shape for insertion into the drive member and for coupling together and for the insertion of drill bits. The lengths and styles of drill rods are made up to the customer's specification, and by proper selection and connection of various lengths of rods, a composite drill rod of the desired length can be obtained. It is therefore important that rods can be quickly connected together and disconnected in order to provide proper length drill rod.

Accordingly, it is a principal object of this invention to provide an improved connector.

A more particular object of this invention is the provision of an improved connector to facilely connect drill rod extensions to drive members or drill rod members to each other.

Still a further object of this invention is the provision of an improved connector member which includes a locking member which will permit facile connection of the connector member to another member and disconnection when desired and yet will prevent unwanted and unintended disconnection.

Still a further, more particular object of this invention is the provision of an improved connector member for connecting drill rod which connector member utilizes a roller on an inclined surface to permit facile connection of the connector member to the extension and desired disconnection but which will prevent unwanted disconnection.

These and other objects, together with a fuller understanding of the invention, will become apparent from the following description when taken in conjunction with the accompanying drawing in which:

FIGURE 1 is an exploded perspective view of a drill bit, a drill rod and a connector member for connecting the drill rod to the drill chuck in position to be assembled according to this invention;

FIG. 2 is a perspective view, partially in section, of a connector member according to this invention being inserted into a drill rod;

FIG. 3 is a perspective view, partially in section, of a connector member according to this invention fully inserted into a drill rod;

FIG. 4 is a connector member according to this invention for connecting two drill rods together, and FIG. 5 is a sectional view of a connector according to this invention inserted in a drill rod having in position a tool to secure the roller member of the connector to permit disengagement of the connector and the drill rod.

Referring now to the drawing, and particularly to FIG. 1, a conventional mining drill bit 10 is shown which has a shank 12 positioned for insertion into one end of a drill rod 14. The shank 12 of the drill bit 10 is hexagonal in shape and configured to fit into hexagonally shaped internal surface 16 of the drill rod 14. A transverse bore 18 extends through the drill rod 14 and is positioned to align with a similar bore 20 formed through the shank 12 of the drill bit 10. When the shank 12 of the drill bit 10 is positioned within the drill rod 14, the bores 18 and 20 will be aligned and therefore in position for reception of cylindrical pin 22. The pin 22 when inserted through the bores 18 and 20, will lock drill bit 10 in position at the end of the drill rod to prevent disengagement of the drill bit when it is being withdrawn from the drilled hole.

A connector member designated generally as 24 is provided which is adapted to connect drill rod 14 to the chuck (not shown) of a drilling rig. The connector member 24 has a hexagonal shaped shank portion 26 and a square shank portion 28 separated by an annular flange 30. The hexagonal shank portion 26 is adapted to be inserted into the drill rod 14 at the opposite end from that in which the drill bit 10 is inserted, and the square shank portion 28 is adapted to be inserted into the drill chuck (not shown). The shank portion 26 has formed therein at one end thereof a notch designated generally as 34. The notch 34 includes an end wall 36 which is substantially normal to the longitudinal axis of the connector member 24, and a planar camming surface 38 which extends from the end wall 36 and forms an acute angle therewith. A slot 39 is formed in the camming surface 38. The connector member 24 is provided with a through axial bore 40, the purpose of which will be described presently. A cylindrical roller member 42 is provided which is disposed to reside in the notch 34 against the end wall 36 and on the camming surface 38. The diameter of the roller 42 is so-selected that when it is resting on the camming surface 38 against the end wall 36, the top of the roller will just touch the flat portion of the surface 16 facing the roller when the shank portion 26 is inserted through opening 44 in the end of the drill rod 14. When the roller is in position in the notch against the end wall 36, and the shank 26 is inserted into the drill rod 14 as shown in FIG. 2, the camming surface 38 will slope toward the flat portion of the surface 16, which it faces, in a direction away from the opening 44. Thus the force exerted in inserting the shank portion 26 into the opening 44 will tend to cause the roller member to roll against the end wall 36 and the cam surface 34, permitting the shank portion 26 to slide freely in through the opening 44. Thus, the connector member can be fully inserted into the drill rod 14 until the annular flange 30 contacts the end of the drill rod 14, as shown in FIG. 3.

If, however, a force is exerted on the connector in a direction which would tend to pull the shank 26 out of the drill rod 14, the coaction of the flat portion of the surface 16 and the roller member 42 would tend to cause the roller to roll away from the end wall 36 and up the camming surface 38. Since cam surface 38 slopes toward the flat portion of the surface 16 which it faces, the roller 32 will act as a wedge between the surfaces 16 and 38 to prevent movement of the connector 24 and the drill rod 14 in a direction which would tend to separate the connector and the drill rod 14. In this way, unintended separation of the connector 24 and the drill rod 14 is prevented.

Referring now to FIG. 4 a connector member for connecting two drill rods end to end is shown and designated generally by the reference character 24'. This connector 24' has first and second hexagonal shank portions 26' and 28' extending in opposite directions from an annular flange portion 30'. The shank portion 26' is provided with a notch 34' similar to the notch 34 on the connector 24. The notch 34' has an end wall 36' and a planar camming surface 38' interrupted by a slot 39'. A transverse bore 41' may be drilled through the shank portion 28' in a position to align with bore 18 in a drill rod. This may be pinned in a manner similar to the pinning of the drill bit 10 when it is inserted in the drill rod. The shank portion 26' is secured in the drill rod by roller 42 in the same way that the shank portion 26 of connector 24 is secured in a drill rod.

In order to remove the connector 24, the shank 28 is removed from the drill chuck and a tool 46, shown in FIG. 5, is utilized to secure the roller 42 against movement so that the connector 24 can be removed from the extension member 14. The tool 46 includes a threaded shank 48 having secured at the remote end thereof a pivot arm 50. The pivot arm 50 is secured to the shank 48 by means of a pivot pin 52. The pivot arm 50 is biased toward a position generally normal to the axis of the shank 48 by a spring 54. The shank 48 has threaded thereon at one end a knurled, enlarged nut 56. The tool is utilized by inserting the shank 48 into the bore 40 until the pivot arm 50 passes the end of the shank 26. The spring 52 will then bias the pivot arm 50 into a position generally normal to the axis of the shank 48. One end of the pivot arm 50 will strike against the shank portion 26, and the other end of the pivot arm 50 will reside in slot 39. The nut 56 is then threaded onto the shank 48 and up tight to the end of shank portion 28 of the connector 24. This will cause the pivot arm 50 to bear firmly and solidly against the roller 42 and against the end of the shank portion 26 of the connector 24. This will prevent the roller from rolling up the cam surface 38 when the connector 24 is pulled out of the drill rod 14. When the connector 24 has been removed the nut 56 is loosened, which will allow the pivot arm 52 to be manually pivoted to a position lying along the axis of the connector 24 and the shank can then be withdrawn from the bore 40 with the arm 50 pivoted as shown in phantom outline in FIG. 5, and retracted from connector 24.

Although several embodiments of this invention have been shown and described, various adaptations and modifications may be made without departing from the scope of the appended claims.

I claim:
1. Apparatus for connecting first and second members for for concurrent rotation wherein said first member has wall means defining a polygonal opening extending inwardly from an entrance at one end thereof, and wherein said second member includes a shank portion having a cross section substantially identical to and slightly smaller than the cross section of said polygonal opening to permit said shank portion to slide freely into the opening of said first member, said apparatus comprising a cam surface formed on said shank portion of the second member, said cam surface having a planar portion facing a flat surface of said wall means of the first member when the shank portion is disposed in said opening, the planar portion of said cam surface sloping toward said flat surface of the wall means it faces in a direction away from the entrance of the opening, roller means positionable in rolling contact with said cam surface and engageable therewith and with the flat surface of said wall means of the first member facing the cam surface, the planar portion of said cam surface being slotted, said second member having an axial bore intersecting said slot, said roller means being so positioned on said cam surface to permit free insertion of said shank portion into said opening while coacting with said cam surface and said wall means to prevent removal of said shank portion from said opening, said axial bore and said slotted cam surface being aligned for insertion of a tool for securing said roller against said cam surface to permit removal of said shank portion of the second member from the opening of the first member.

2. The combination of claim 1 wherein said second member includes stop means adjacent said shank portion and cooperating with the end of said first member adjacent said polygonal opening for limiting insertion of said second member into said first member.

3. The combination of claim 2 wherein said second member includes a second shank portion in axial alignment with the first shank portion with said stop means being disposed intermediate said first and second shank portions, said second shank portion being adapted for connection to a third member for concurrent rotation therewith.

4. The combination of claim 3 wherein said first and said second shank portions are hexagonal in cross section.

5. The combination according to claim 4 where one of said first shank portions is hexagonal in cross section and the other of said shank portions is rectangular in cross section.

References Cited

UNITED STATES PATENTS

| 389,005 | 9/1888 | Peck | 279—30 X |
| 614,192 | 11/1898 | Welles. | |
| 1,858,595 | 5/1932 | Parker et al. | 248—337 |
| 2,089,166 | 8/1937 | Reichhardt | 279—30 |
| 2,382,291 | 8/1945 | Carlberg. | |
| 2,571,570 | 10/1951 | Hager | 81—177 |
| 2,702,197 | 2/1955 | Sabatino | 280—298 |
| 2,963,930 | 12/1960 | Clothier et al. | 81—177 |

FOREIGN PATENTS 143,187 8/1903 Germany.

CARL W. TOMLIN, *Primary Examiner.*

T. F. CALLAGHAN, *Assistant Examiner.*